(12) United States Patent
Hasegawa

(10) Patent No.: US 9,026,437 B2
(45) Date of Patent: May 5, 2015

(54) LOCATION DETERMINATION SYSTEM AND MOBILE TERMINAL

(75) Inventor: Eiji Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 433 days.

(21) Appl. No.: 13/429,561

(22) Filed: Mar. 26, 2012

(65) Prior Publication Data

US 2012/0253819 A1 Oct. 4, 2012

(30) Foreign Application Priority Data

Mar. 31, 2011 (JP) ................................. 2011-078564

(51) Int. Cl.
*G10L 21/028* (2013.01)
*G10L 21/0308* (2013.01)
*G10L 25/06* (2013.01)
*G10L 25/51* (2013.01)
*H04M 1/725* (2006.01)

(52) U.S. Cl.
CPC .............. *G10L 25/51* (2013.01); *G10L 21/0308* (2013.01); *G10L 21/028* (2013.01); *G10L 25/06* (2013.01); *H04M 1/72522* (2013.01); *H04M 1/7253* (2013.01); *H04M 1/72572* (2013.01)

(58) Field of Classification Search
CPC .................................................. G06F 17/30743
USPC ........................... 455/456.1; 367/124; 700/94
See application file for complete search history.

(56) References Cited

U.S. PATENT DOCUMENTS 6,130,949 A * 10/2000 Aoki et al. .................... 381/94.3
7,747,338 B2 * 6/2010 Korhonen ....................... 700/94
8,447,329 B2 * 5/2013 Kadirkamanathan et al. ........................... 455/456.1
8,626,498 B2 * 1/2014 Lee ................................ 704/210
8,699,944 B2 * 4/2014 Malamud et al. ................ 455/39
2003/0182113 A1 * 9/2003 Huang .......................... 704/231
2004/0225470 A1 * 11/2004 Raykar et al. ................. 702/150
2006/0270419 A1 * 11/2006 Crowley et al. ............ 455/456.2

(Continued)

FOREIGN PATENT DOCUMENTS

JP 01-187478 7/1989
JP 2004-328308 11/2004

(Continued)

OTHER PUBLICATIONS

Moses, Randolph L., Dushyanth Krishnamurthy, and Robert M. Patterson. "A self-localization method for wireless sensor networks." EURASIP Journal on Applied Signal Processing (2003): 348-358.*

(Continued)

*Primary Examiner* — Matthew Baker
(74) *Attorney, Agent, or Firm* — Staas & Halsey LLP

(57) ABSTRACT

A location determination system includes a first mobile terminal and a second mobile terminal. The first mobile terminal includes a first processor to acquire a first sound signal, analyze the first sound signal to obtain a first analysis result, and transmit the first analysis result. The second mobile terminal includes a second processor to acquire a second sound signal, analyze the second sound signal to obtain a second analysis result, receive the first analysis result from the first mobile terminal, compare the second analysis result with the first analysis result to obtain a comparison result, and determine whether the first mobile terminal locates in an area in which the second mobile terminal locates, based on the comparison result.

14 Claims, 11 Drawing Sheets

(56) References Cited

U.S. PATENT DOCUMENTS

| | | | |
|---|---|---|---|
| 2007/0137462 A1* | 6/2007 | Barros et al. | 84/453 |
| 2008/0027714 A1* | 1/2008 | Hiekata et al. | 704/203 |
| 2008/0243494 A1 | 10/2008 | Okamoto et al. | |
| 2011/0301730 A1* | 12/2011 | Kemp et al. | 700/94 |
| 2012/0202514 A1* | 8/2012 | Kadirkamanathan et al. | 455/456.1 |
| 2012/0263020 A1* | 10/2012 | Taylor et al. | 367/124 |
| 2012/0295637 A1* | 11/2012 | Hannuksela et al. | 455/456.1 |
| 2013/0022216 A1* | 1/2013 | Ganong et al. | 381/92 |
| 2014/0129231 A1* | 5/2014 | Herring et al. | 704/270.1 |

FOREIGN PATENT DOCUMENTS

| | | |
|---|---|---|
| JP | 2006-58164 | 3/2006 |
| JP | 2008-242318 | 10/2008 |
| JP | 2008-271465 | 11/2008 |
| JP | 2010-230380 | 10/2010 |

OTHER PUBLICATIONS

Borriello, Gaetano, et al. "WALRUS: wireless acoustic location with room-level resolution using ultrasound." Proceedings of the 3rd international conference on Mobile systems, applications, and services. ACM, 2005.*

Japanese Office Action dated Sep. 24, 2014 in corresponding Japanese Patent Application No. 2011-078564.

* cited by examiner

MOBILE TERMINAL 12A:

| TIME | IN SAME SPACE | IN DIFFERENT SPACE |
|---|---|---|
| 1/18 12:00:00 | B,C | D |
| 1/18 12:10:00 | B | C,D |

MOBILE TERMINAL 12C:

| TIME | IN SAME SPACE | IN DIFFERENT SPACE |
|---|---|---|
| 1/18 12:00:00 | A,B | D |
| 1/18 12:10:00 | D | A,B |

LOCATION DETERMINATION SYSTEM AND MOBILE TERMINAL

CROSS-REFERENCE TO RELATED APPLICATION

This application is based upon and claims the benefit of priority of the prior Japanese Patent Application No. 2011-078564, filed on Mar. 31, 2011, the entire contents of which are incorporated herein by reference.

FIELD

The embodiments discussed herein are related to a location determination system and a mobile terminal.

BACKGROUND

Currently, many of mobile terminals or car navigation systems possessed by many people have a positioning function based on the Global Positioning System (GPS). These devices detect their current location and present the detection result to the user or associate the detection result with various types of information.

If a mobile terminal holds information on whether the mobile terminal is located in the same room, that is, in the same space, as any other mobile terminals, the user of the mobile terminal may, for example, exchange information with a particular person present in the same space. Furthermore, since the mobile terminal may record, as action logs, identifier (ID) information or the like of other mobile terminals located in the same space, the user may know later with whom the user has acted in the same space, on the basis of the ID information of other mobile terminals.

However, it is difficult to determine the location indoors using the GPS-based positioning function. On the other hand, it is possible to obtain ID information of a nearly-located mobile terminal, for example, using a wireless communication technique such as a wireless local area network (LAN), the Bluetooth, or the like. However, radio waves in the radio band detour around the walls partitioning the rooms or pass through the walls or windows. For this reason, the intensity level of the radio wave signal does not easily vary among the adjacent rooms partitioned by the walls. This makes it difficult to determine whether mobile terminals are located in the same space.

On the other hand, it is known that there is a device that identifies the location using a simple system in the underground, the inside of a building, or the like, which radio waves from a GPS satellite do not reach. Specifically, the device includes an information providing device that transmits location information on the installation location of the information providing device or its vicinity, a reception unit that receives the location information from the information providing device, and an ultrasonic transmission unit that ultrasonically transmits the location information received by the reception unit. That is, the device may identify its location in the underground, a building, or the like by ultrasonically transmitting the location information.

It is also known that there is a mobile terminal, positioning system, and positioning server that identify the location in an indoor environment in a simplified manner. Specifically, the mobile terminal includes a storage unit that stores information on the position in which a sound source is placed and information on the contents of a sound emitted by this sound source in such a manner that the pieces of information are associated with each other, an obtaining unit that obtains a sound signal from the sound source, an identification unit that identifies the sound source, which has emitted the sound signal, and the location of the sound source by referring to the storage unit on the basis of the contents of the sound of the obtained sound signal, and a reporting unit that reports the location identified by the identification unit. That is, the mobile terminal identifies its current location by obtaining the sound signal from the external sound source.

Japanese Laid-open Patent Publications Nos. 2006-58164 and 2008-271465 disclose related techniques.

In both the system using ultrasound and the system using a sound signal from the external sound source described above, none of ultrasound and a sound signal from the external sound source does not easily pass through the indoor wall and is less likely to detour around the window or wall to enter the room. Thus, ultrasound or sound signals in the respective rooms partitioned by the indoor walls may be distinguished from one another. However, these systems use an ultrasonic sound source or a sound source device in each room. This would take installation cost and complicate the system. On the other hand, the location of a mobile terminal may be identified by emitting visible light which does not easily pass through the wall or hardly detours around the window or wall to enter the room, rather than emitting ultrasound or a sound signal using a sound source device. However, this also uses a light source device for emitting visible light, which would take installation cost and complicate the system.

SUMMARY

According to an aspect of the present invention, provided is a location determination system including a first mobile terminal and a second mobile terminal. The first mobile terminal includes a first processor to acquire a first sound signal, analyze the first sound signal to obtain a first analysis result, and transmit the first analysis result. The second mobile terminal includes a second processor to acquire a second sound signal, analyze the second sound signal to obtain a second analysis result, receive the first analysis result from the first mobile terminal, compare the second analysis result with the first analysis result to obtain a comparison result, and determine whether the first mobile terminal locates in an area in which the second mobile terminal locates, based on the comparison result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
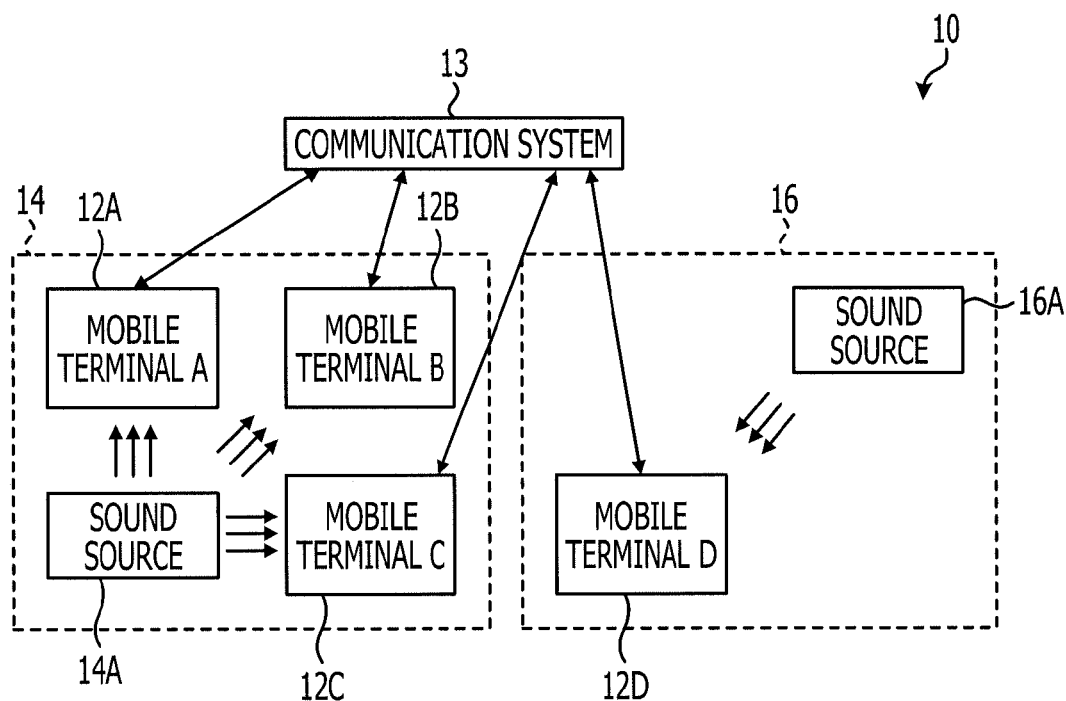
FIG. 1 is a diagram illustrating a location determination system according to an embodiment.

Now, a location determination system and mobile terminal according to an embodiment will be described. FIG. 1 is a diagram illustrating a location determination system 10 according to this embodiment.

Location Determination System

The location determination system 10 includes multiple mobile terminals 12 and a communication system 13, which communicably connects the mobile terminals 12 with each other. A known communication network system including multiple base stations is used as the communication system 13. In the embodiment illustrated in FIG. 1, the mobile terminals 12 include mobile terminals 12A to 12D. In the description below, the mobile terminals 12A to 12D may be collectively referred to as the mobile terminals 12. Each mobile terminal 12 has a normal mode in which the mobile terminal 12 makes or receives a voice call to or from any other mobile terminal 12 or transmits or receives an email to or from any other mobile terminal 12. Each mobile terminal 12 also has a location determination mode in which it is determined whether the mobile terminal 12 is located in the same space as any other mobile terminals 12.

In an example illustrated in FIG. 1, the mobile terminals 12A to 12C among the mobile terminals 12A to 12D are located in a room 14, and the mobile terminal 12D is located in a room 16. The rooms 14 and 16 are partitioned by a wall, so that sounds are not easily propagated. Sound sources 14A and 16A present in the rooms 14 and 16, respectively, are not sound sources installed for positioning but, for example, speakers who make speeches to audiences gathering in the rooms 14 and 16. That is, ambient sound sources in the rooms 14 and 16 are represented as the sound sources 14A and 16A. Ambient sounds may be voices made by the users holding the mobile terminals 12A to 12D. The sounds to be collected in this embodiment are voices but are not limited thereto. Sounds made by the sound sources 14A and 16A may be of any type as long as they are made for audiences gathering in the rooms 14 and 16 for particular purposes. For example, sounds may be music given by sound source devices. In the description below, assume that sounds made by the sound sources 14A and 16A are voices.

The mobile terminals 12A to 12D each collect voices made by the sound source 14A or sound source 16A, obtain voice signals, and analyze the feature quantity of the obtained voice signals, for example, analyze the frequency components thereof. Further, the mobile terminals 12A to 12D exchange the results of the frequency component analyses, that is, the feature quantities of the voices with one another and determine the similarity between the analysis results. Each of the mobile terminals 12A to 12D determines to be located in the same space, that is, in the room 14 or room 16, as the mobile terminal 12 which has exchanged the analysis results having high similarity.

Accordingly, the location determination system 10 does not use sound sources, unlike conventional positioning systems, and each mobile terminal 12 may easily determine whether the mobile terminal 12 is located in the same space as any other mobile terminals 12, by analyzing the frequency components of the collected ambient sound and exchanging the analysis result with other mobile terminals 12. Hereinafter, such a determination will be referred to as a "location determination".

Mobile Terminal

Figure 2A:
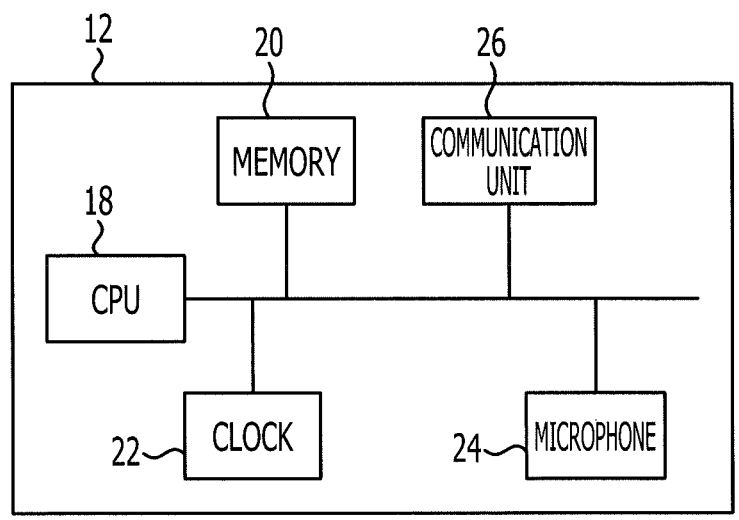
FIG. 2A is a diagram illustrating a hardware configuration of a mobile terminal illustrated in FIG. 1.
Figure 2B:
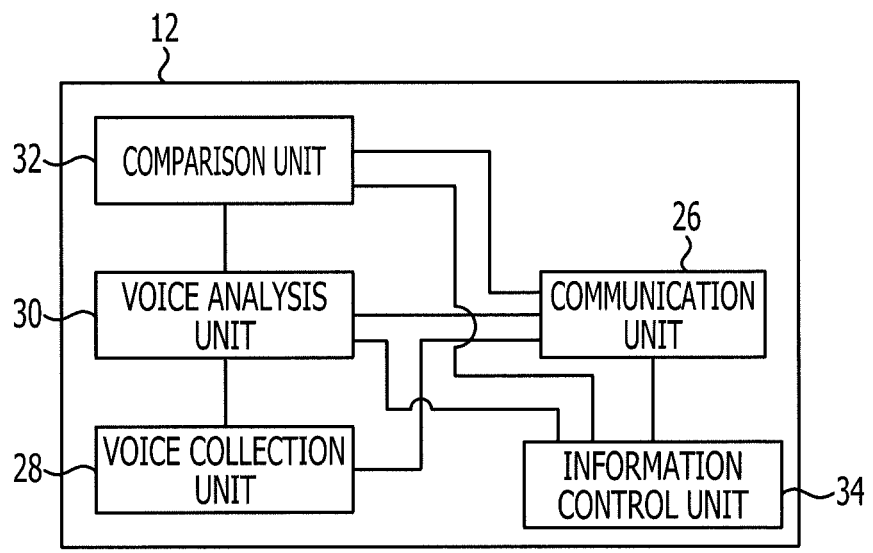
FIG. 2B is a diagram illustrating a function configuration of a mobile terminal illustrated in FIG. 1.

FIG. 2A is a diagram illustrating a hardware configuration of the mobile terminal 12. FIG. 2B is a diagram illustrating a function configuration of the mobile terminal 12.

The mobile terminal 12 may communicate with other mobile terminals 12 via the communication system 13. The mobile terminal 12 includes a central processing unit (CPU) 18, a memory 20, a clock 22, a microphone 24, and a communication unit 26. In addition, the mobile terminal 12 includes a device having a movement detection function using an acceleration sensor, a movement detection function using a wireless LAN, a positioning function using the Global Positioning System (GPS), or the like.

The CPU 18 controls operations of the components of the mobile terminal 12. The memory 20 stores the results of the operations of the components of the mobile terminal 12, as well as a program for performing a location detection method (to be discussed later). The clock 22 outputs current time information in accordance with an instruction of the CPU 18. The communication unit 26 may communicate with the communication units 26 of other mobile terminals 12 via the communication system 13. The microphone 24 collects a voice made by the user, as well as voices made by other persons and obtains voice signals.

When the mobile terminal 12 shifts from the normal mode to the location determination mode, the mobile terminal 12 calls and executes the program stored in the memory 20 and forms software modules as illustrated in FIG. 2B. Specifically, when shifted to the location determination mode, the mobile terminal 12 obtains a voice collection unit 28, a voice analysis unit 30, a comparison unit 32, and an information control unit 34, as well as the communication unit 26. The processes performed by the voice collection unit 28, the voice analysis unit 30, the comparison unit 32, and the information control unit 34 are substantially performed by the CPU 18.

The voice collection unit 28 collects voices in the room 14 or room 16 through the microphone 24 and obtains voice signals, at the timing according to an instruction of the information control unit 34. The voice collection unit 28 then adds, to the obtained voice signals, information indicating the time when each voice has been collected, which is indicated by the clock 22. Voices are collected at given time intervals, and the obtained voice signals are then transmitted to the voice analysis unit 30.

The voice analysis unit 30 cuts out the voice signals at timings according to an instruction of the information control unit 34, that is, at given time intervals, and analyzes the frequency components of the cut-out voice signals. In the frequency component analysis, the voice analysis unit 30 obtains multiple peak frequencies, for example, five peak frequencies having the first to fifth largest peak values, using fast Fourier transformation (FFT), for example. The reason why the peak frequencies are obtained is that a peak frequency is a feature quantity of a voice signal, that is, a feature quantity of a voice and that a comparison between peak frequencies makes it easy to determine whether a voice collected by a mobile terminal 12 is the same as a voice collected by another mobile terminal 12. On the other hand, the volume of a voice varies according to the properties of the microphone 24 or according to on what body part of the user the mobile terminal 12 is placed. Accordingly, it is difficult to determine whether a voice collected by a mobile terminal 12 is the same as a voice collected by another mobile terminal 12 using the volume of voices.

While the voice analysis unit 30 according to this embodiment analyzes the frequency components, the voice analysis unit 30 may identify voice contents from the voice signal and then perform word analysis rather than analyzing the frequency components. The voice analysis unit 30 adds the time information, which has been added to the voice signal, to the result of the analysis performed by the voice analysis unit 30 and transmits the resulting information to the comparison unit 32 and the communication unit 26. In this analysis, multiple peak frequencies are obtained at timings according to an instruction of the information control unit 34, that is, at given time intervals, and information on the peak frequencies is then transmitted to the comparison unit 32 and the communication unit 26. The communication unit 26 receives the information (hereinafter, referred to as peak information) on the multiple peak frequencies, which is accompanied by the time information, and transmits the peak information accompanied by the time information to other mobile terminals 12. Since the communication units 26 of other mobile terminals 12 also transmit peak information accompanied by time information, the communication unit 26 receives peak information accompanied by time information from other mobile terminals 12.

The comparison unit 32 compares the peak information accompanied by the time information received from the voice analysis unit 30 with peak information accompanied by time information received from another mobile terminal 12 via the communication unit 26. Based on the comparison result, the comparison unit 32 determines whether its own mobile terminal 12 is located in the same space as the compared mobile terminal 12. In the above-mentioned comparison, the comparison unit 32 uses the peak information obtained at the same time.

That is, the comparison unit 32 compares both pieces of peak information obtained at the same time. Specifically, the comparison unit 32 compares the peak information obtained through the analysis performed by its own mobile terminal 12 with the peak information obtained at the same time and transmitted by another mobile terminal 12.

More specifically, the comparison unit 32 obtains peak information at given time intervals and compares the peak information with peak information obtained bay another mobile terminal 12 at the same time. The comparison unit 32 counts the number of matched peak frequencies between both pieces of peak information and determines whether the number of matched peak frequencies is a given number or greater. The comparison unit 32 calculates a ratio of cases in which the number of matched peak frequencies is a given number or greater within the predetermined time period and determines whether the ratio is equal to or greater than a threshold. That is, the comparison unit 32 obtains information on multiple peak frequencies, which are feature quantities of voices, at time intervals within a predetermined time period and determines the similarity (the degree of matching) between the feature quantities of voices (peak information) and feature quantities of voices obtained by another mobile terminal 12. The comparison unit 32 then calculates the ratio of cases in which this similarity becomes equal to or greater than a threshold for similarity comparison within the predetermined time period and checks whether the ratio is equal to or greater than a threshold for the ratio evaluation. For example, the comparison unit 32 compares the respective five peak frequencies obtained at the same time, obtains the number of matched peak frequencies, divides this number by five, and considers the obtained number as similarity. Then, the comparison unit 32 calculates the ratio of cases in which this similarity becomes equal to or greater than a predetermined threshold for similarity comparison and compares the ratio with a threshold for ratio evaluation. For example, suppose that the predetermined threshold for similarity comparison is 0.6 and the threshold for ratio evaluation is 0.8. Then, the mobile terminal 12 determines that it is located in the same space as the compared mobile terminal 12 if the ratio of cases in which the number of matched peak frequencies among the five peak frequencies is three or more in the comparison between both pieces of peak information obtained at the same time is eight times or more in ten times.

The plural pieces of the peak information obtained at the same time are extracted on the basis of the time information added to the peak information. The time information added to the peak information transmitted by another mobile terminal 12 represents the time when another mobile terminal 12 has collected a voice. This time may differ among the mobile terminals 12. For this reason, the information control unit 34 (to be discussed later) obtains information about such a time difference in advance and transmits, to another mobile terminal 12, an instruction for collecting voices at a timing which the time difference is taken into account.

When shifted to the location determination mode, the information control unit 34 exchanges identification information of each mobile terminal 12 and time information currently indicated by each mobile terminal 12 with other mobile terminals 12 shifted to the location determination mode by transmitting and receiving such identification information and time information to and from the other mobile terminals 12. The information control unit 34 then collects voices, analyzes voice signals, and transmits the analysis results. By obtaining the identification information of other mobile terminals 12 with which a location determination is to be performed, the information control unit 34 obtains information on other mobile terminals 12 and manages the obtained information. Also, by obtaining the time information of other mobile terminals 12 with which a location determination is to be performed, the information control unit 34 sets time differences for other mobile terminals 12. Specifically, the information control unit 34 calculates the difference between time information transmitted by another mobile terminal 12 and current time information indicated by its own mobile terminal 12 and considers the calculated difference as the time difference. The time difference is used to make an instruction on voice collection timing to another mobile terminal 12. That is, when shifted to the location determination mode, the information control unit 34 controls the components of its own mobile terminal 12 so that voice collection, voice signal analysis, and transmission of the analysis result are performed at predetermined timings. The information control unit 34 also makes instructions on voice collection timings to other mobile terminals 12 so that the voice collection timings of other mobile terminals 12 match the voice collection timing of its own mobile terminal 12.

The information control unit 34 also stores and manages information about which of other mobile terminals 12 shifted to the location determination mode is located in the same space as its own mobile terminal 12.

Since the mobile terminals 12A to 12D are shifted to the location determination mode in this embodiment, each mobile terminal 12 receives three analysis results transmitted by other mobile terminals 12. Each mobile terminal 12 then compares the received three analysis results with the analysis result of its own mobile terminal 12 and makes a determination.

In this embodiment, each mobile terminal 12 collects a voice and analyzes a voice signal using the voice analysis unit 30 and transmits and receives the analysis result to and from other mobile terminals 12. Alternatively, instead of the analysis result, each mobile terminal 12 may transmit and receive a yet-to-be-analyzed voice signal. In this case, each of the voice signals received by the communication unit 26 is accompanied by information indicating the time when the corresponding mobile terminal 12 has collected the voice. The voice analysis unit 30 then analyzes this voice signal along with the voice signal of the voice collected by its own voice collection unit 28. The comparison unit 32 then compares the analysis results of the two voice signals and makes a determination.

Hereinafter, the information that the mobile terminals 12 exchange with one another by transmission and reception will be collectively referred to as "voice signal information". The voice signal information may be the voice signals or the analysis results. While the frequency components of a voice are analyzed and the peak frequencies are used as the feature quantity in this embodiment, other voice feature quantities may be used. For example, the frequency power spectrum density may be used as a feature quantity of a voice, or a character string obtained by recognizing a voice as language may be used as a feature quantity.

Location Determination Method

Figure 3:
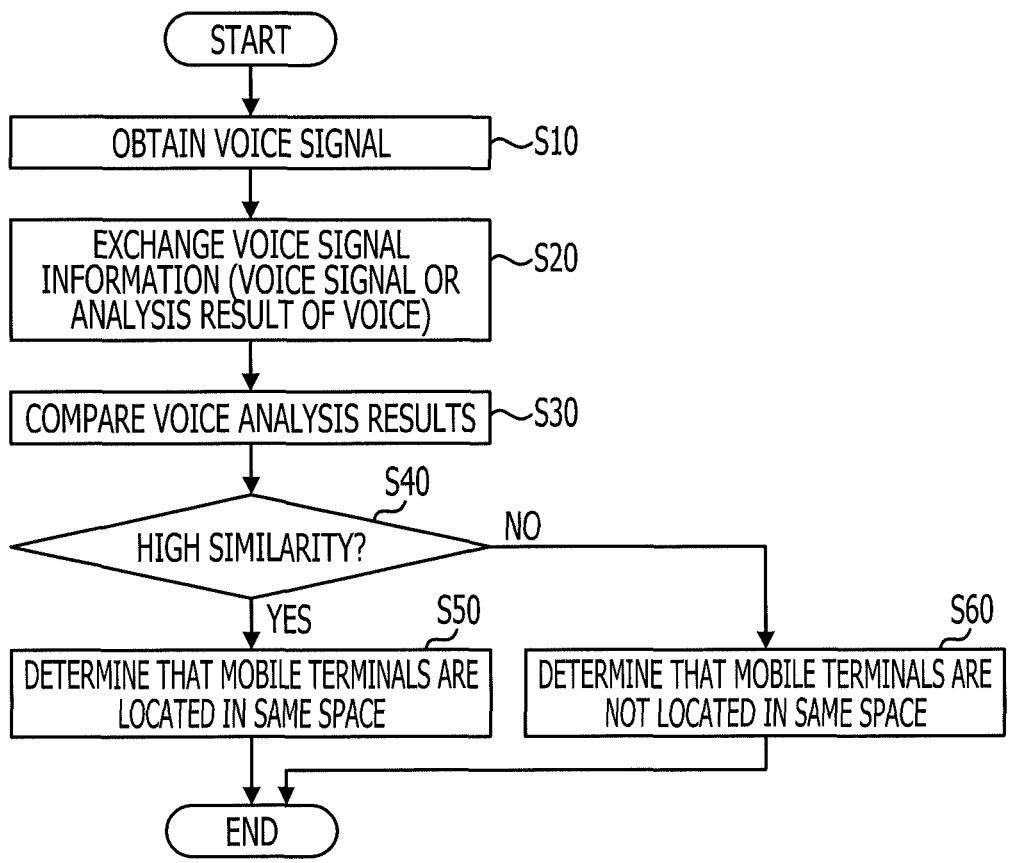
FIG. 3 is a diagram illustrating a flow of a location determination method according to an embodiment.

FIG. 3 is a diagram illustrating the flow of a location determination method according to this embodiment.

In a mobile terminal 12 shifted to the location determination mode, first, the voice collection unit 28 collects a voice made by the sound source 14A or sound source 16A at a timing determined by the information control unit 34 (in S10). Voices as ambient sounds made by the sound source 14A or sound source 16A are preferably made continuously over a given time period.

The mobile terminal 12 then exchanges voice signal information (the analysis result of a voice or a voice signal) with other mobile terminals 12 by transmission and reception (in S20). Where the four mobile terminals 12A to 12D, exchange voice signal information with one another as illustrated in FIG. 1, each mobile terminal 12 receives voice signal information from the other three mobile terminals 12. Each mobile terminal 12 performs the same process. Accordingly, when a mobile terminal 12 transmits voice signal information to the other mobile terminals 12, the mobile terminal 12 receives voice signal information from the other mobile terminals 12.

In the case where voice signal information to be exchanged is the analysis result of a voice, a voice collected by the voice collection unit 28 of the mobile terminal 12 is analyzed by the voice analysis unit 30 and the analysis result is then transmitted to the comparison unit 32. The communication unit 26 receives the analysis results of voices from other mobile terminals 12 and transmits them to the comparison unit 32.

In the case where voice signal information to be exchanged is a voice signal, the communication unit 26 receives voice signals from other mobile terminals 12 and transmits them to the voice analysis unit 30. The voice analysis unit 30 analyzes the voice signal of the voice collected by its own mobile terminal, as well as the voice signals of the voices collected by other mobile terminals 12. The voice analysis unit 30 then transmits the analysis results to the comparison unit 32.

Subsequently, the comparison unit 32 compares the analysis results (in S30). The analysis results are, for example, peak information obtained by frequency component analysis. Accordingly, the comparison unit 32 receives peak information based on the collected voices and peak information based on the voice signal information received and then transmitted by the communication unit 26. The comparison unit 32 then checks whether the ratio of the cases in which the number of matched peak frequencies between both pieces of peak information is equal to or greater than a given number is equal to or greater than a threshold within a predetermined time period. Thus, the comparison unit 32 determines whether the compared mobile terminal 12 which has transmitted the voice signal information is located in the same space as its own mobile terminal 12. Even when the volume of the voice varies or an acoustic effect occurs in the room, the peak frequency of the voice does not vary significantly as long as the voice is collected in the same space. For this reason, the degree of matching between the peak frequencies may be used for a determination as the similarity between the voices.

The comparison unit 32 determines whether the above-mentioned similarity is high, that is, determines whether the ratio of cases in which the number of matched peak frequencies between both pieces of peak information is equal to or greater than a given number is equal to or greater than a predetermined threshold within a predetermined time period (in S40). If the similarity is determined to be high, that is, the degree of matching between both pieces of peak information is determined to be high (YES in S40), the comparison unit 32 determines that its own mobile terminal 12 is located in the same space as the compared mobile terminal 12 which has transmitted the voice signal information, that is, the comparison unit 32 determines that the two mobile terminals 12 are located in the space having the same sound source (in S50). In contrast, if the similarity is determined be low, that is, the degree of matching between both pieces of peak information is determined to be low (NO in S40), the comparison unit 32 determines that the its own mobile terminal 12 is not located in the same space as the compared mobile terminal 12 which has transmitted the voice signal information, that is, the comparison unit 32 determines that the two mobile terminals 12 are located in different spaces having different sound sources (in S60).

As seen above, the mobile terminal 12 determines whether it is located in the same space as another mobile terminal 12, on the basis of the comparison between the analysis results of the voices as ambient sounds in the rooms. This makes it possible to determine whether mobile terminals 12 are located in the same space, for example, in the same room using a simple method without taking cost.

Further, the voice analysis unit 30 analyzes frequency components of the voice signal and obtains peak information, that is, information on the multiple peak frequencies, as the analysis result. The comparison unit 32 makes a comparison between two pieces of peak information. This makes it possible to accurately determine the similarity between the collected voices.

The voice analysis unit 30 analyzes frequency components at given time intervals to obtain peak information. The comparison unit 32 makes a comparison between two pieces of peak information obtained at the same time. Thus, the comparison unit 32 may more accurately determine the similarity between the voices. Further, the comparison unit 32 obtains the peak information obtained at given time intervals within a predetermined time period and then checks whether the ratio of cases in which the number of matched peak frequencies between both pieces of peak information is equal to or greater than a given number is equal to or greater than a threshold within a predetermined time period. Thus, the comparison unit 32 may more accurately determine the similarity between the voices.

First Modification of Location Determination System

Figures 4A, 4B, 4C:
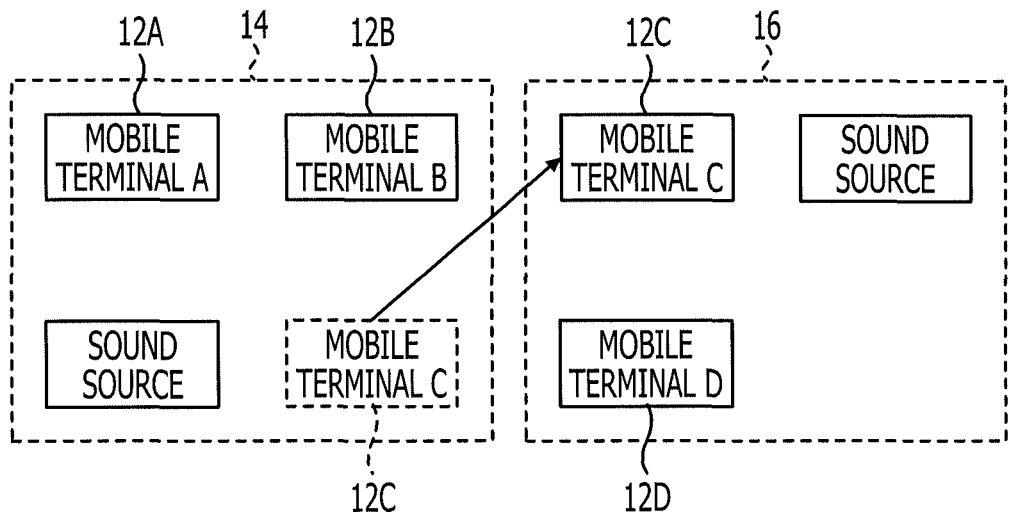
FIGS. 4A to 4C are diagrams illustrating a first modification where multiple mobile terminals in a location determination system are shifted to a location determination mode.

FIGS. 4A to 4C are diagrams illustrating a first modification where multiple mobile terminals 12 in a location determination system are shifted to a location determination mode.

In this modification, first, mobile terminals 12A to 12C are located in a room 14, and a mobile terminal 12D is located in a room 16, as in the example illustrated in FIG. 1. Then, the mobile terminal 12C moves to the room 16 as its user moves there.

In this case, the mobile terminal 12C detects its own movement using an acceleration sensor (not illustrated), a change of access point in a wireless LAN, GPS-based positioning, or the like and generates a trigger signal for shifting to the location determination mode. Thus, the mobile terminal 12C and the mobile terminals 12A, 12B, and 12D shift to the location determination mode. In the location determination mode, the mobile terminals 12A to 12D repeat S10 to S60 in accordance with the flow illustrated in FIG. 3. Thus, as illustrated in FIG. 4B, the information control unit 34 of the mobile terminal 12A stores information of January 18 12:10, which has been generated owing to the current movement of the mobile terminal 12C, in addition to information of January 18 12:00. This means that the mobile terminal 12C has moved from the space having the mobile terminal 12A therein to the space having the mobile terminal 12D therein between 12:00 and 12:10.

On the other hand, as illustrated in FIG. 4C, information of January 18 12:00 and information of January 18 12:10 stored in the information control unit 34 of the mobile terminal 12C indicate that the mobile terminals 12A and 12B, which have been present in the same space as the mobile terminal 12C as of January 18 12:00, is present in different space from the mobile terminal 12C as of January 18 12:10 and that the mobile terminal 12D, which has been present in different space from the mobile terminal 12C as of January 18 12:00, is present in the same space as the mobile terminal 12C as of January 18 12:10.

Figure 5:
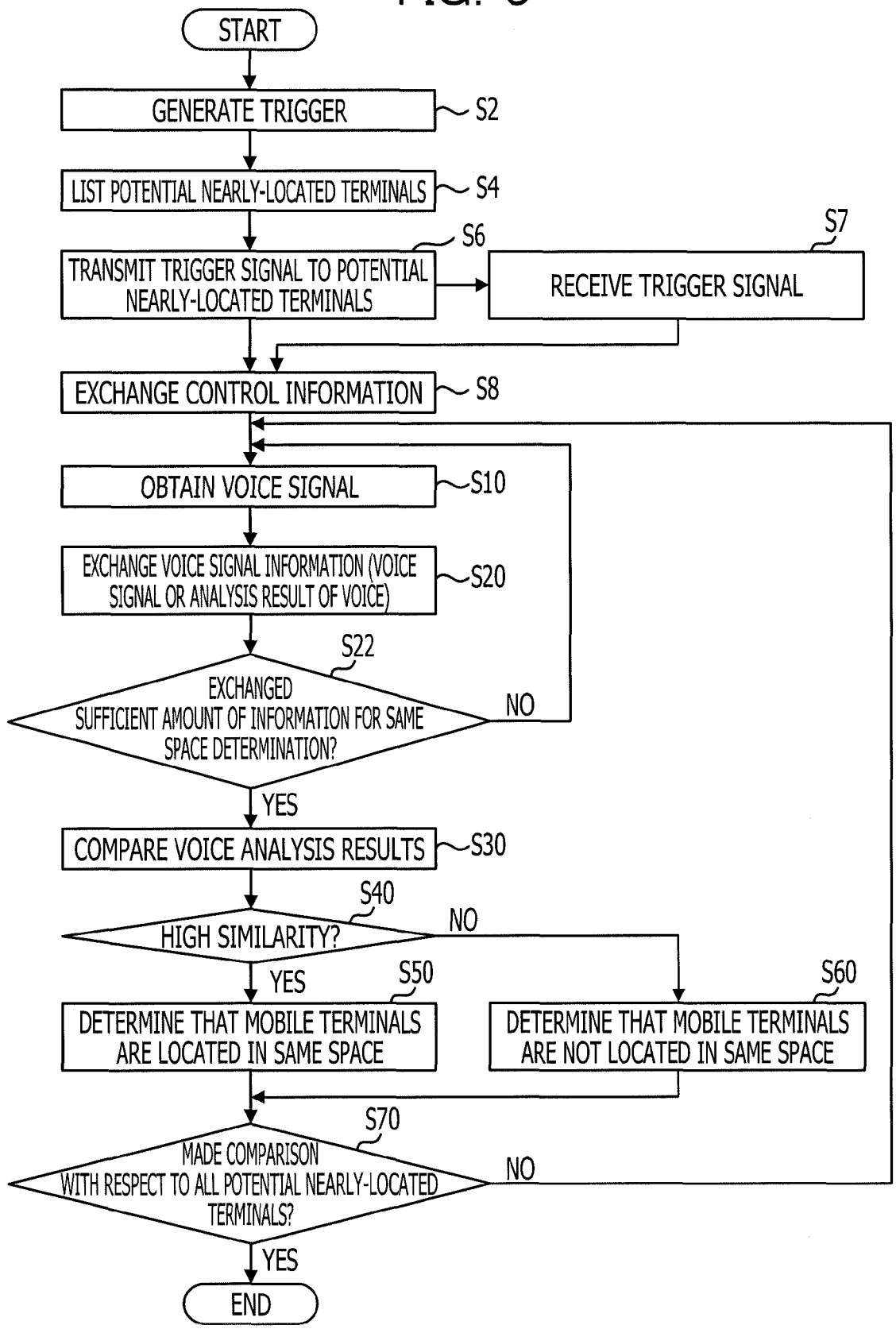
FIG. 5 is a diagram illustrating a flow of a location determination method according to a first modification illustrated in FIG. 4A.

FIG. 5 is a diagram illustrating the flow of a location determination method in a case where the mobile terminal 12C moves.

In FIG. 5, same operations as those in FIG. 3 are assigned same numbers and will not be described. Hereinafter, a case illustrated in FIG. 4A where the mobile terminal 12C among the mobile terminals 12A to 12D moves will be described.

First, the mobile terminal 12C detects its own movement using an acceleration sensor included in the mobile terminal 12C, a wireless-LAN-based location detection function, or a GPS-based positioning function. Then, the information control unit 34 of the mobile terminal 12C generates a trigger signal for shifting to the location determination mode (in S2). Upon this trigger signal, the information control unit 34 lists other mobile terminals 12 nearly-located to (approximately at the same position) the mobile terminal 12C (in S4). For example, the information control unit 34 considers, as a nearly-located mobile terminal 12, a mobile terminal 12 having the same access point in a wireless LAN or a mobile terminal detected to be located in approximately the same position using a GPS-based location detection function. Specifically, the information control unit 34 lists the mobile terminals 12A, 12B, and 12D. In this case, the information control unit 34 may selectively list the mobile terminals 12A, 12B, and 12D, which are nearly-located, from among many mobile terminals 12 which are previously set and registered as a group.

The information control unit 34 then instructs the communication unit 26 to transmit a trigger signal to the listed mobile terminals 12A, 12B, and 12D. As seen above, the mobile terminal 12C transmits a trigger signal to the listed mobile terminals which are nearly-located (hereinafter referred to as "potential nearly-located terminals") (in S6). When the potential nearly-located terminals, the mobile terminals 12A, 12B, and 12D, receive the trigger signal from the mobile terminal 12C (in S7), the mobile terminals 12A, 12B, and 12D and the mobile terminal 12C exchange control information recorded in the respective information control units 34 with one another (in S8). The control information includes, for example, ID information and current time information of each mobile terminal 12. The mobile terminals 12 may identify one another by exchanging the ID information with one another. Further, by exchanging the current time information, each mobile terminal 12 may determine whether there is a difference between the current time information of any other mobile terminal 12 and that of the mobile terminal 12 itself, that is, may determine time difference information. The time difference information is used to determine a voice collection timing of the corresponding mobile terminal 12 and to instruct this mobile terminal 12 to collect a voice at that timing.

Subsequently, the same processes as S10 and S20 illustrated in FIG. 3 proceed with one (referred to as a current potential nearly-located terminal) of the potential nearly-located terminals in accordance with an instruction of the information control unit 34. After S20, the information control unit 34 determines whether the mobile terminal 12C has exchanged, with the current potential nearly-located terminal, a sufficient amount of voice signal information (voice signals or analysis results) to determine whether the current potential nearly-located terminal is located in the same space (in S22). If a sufficient amount of voice signal information has not been exchanged, the process returns to S10. In contrast, if a sufficient amount of voice signal information has been exchanged, a comparison is made with respect to the analysis result obtained by the voice analysis unit 30. In the case where the voice signal information is the analysis result of the voice signal, the analysis result received by the communication unit 26 is transmitted to the comparison unit 32 and then compared with the analysis result obtained by the voice analysis unit 30. In the case where the voice signal information is the voice signal, the voice signal received by the communication unit 26 is transmitted to the voice analysis unit 30 and then analyzed by the voice analysis unit 30 along with the voice signal of the voice collected by the mobile terminal 12C. The analysis results are transmitted to the comparison unit 32. After performing S30 to S60, the information control unit 34 determines whether a comparison and determination have been performed with respect to all the listed potential nearly-located terminals (in S70). If a comparison and determination have been performed with respect to all the potential nearly-located terminals (YES in S70), the location determination process completes. If a comparison or determination have not been performed with respect to some of the potential nearly-located terminals (NO in S70), the process returns to S10, and S10 to S70 are repeated.

As seen above, in each mobile terminal 12, the communication unit 26 transmits the current time information to other mobile terminals 12, as well as receives the current time information of other mobile terminals 12. The information control unit 34 then determines the time difference between the time information indicated by each of other mobile terminals 12 and the time information indicated by its own mobile terminal 12. Thus, the voice collection units 28 of the mobile terminals 12 may collect voices at the same time on the basis of the obtained time differences.

Second Modification of Location Determination System

Figure 6:
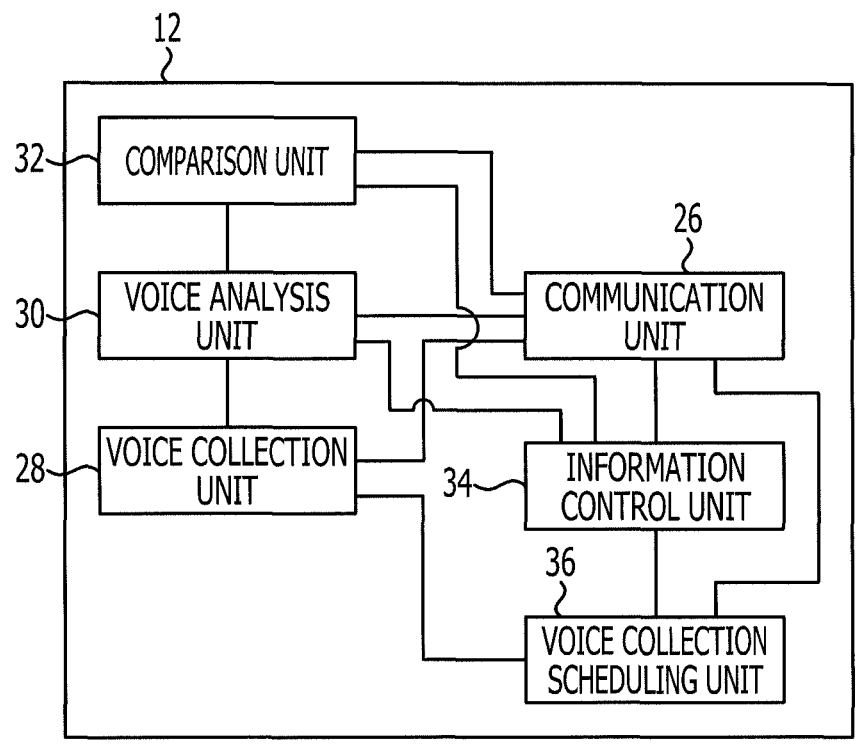
FIG. 6 is a diagram illustrating a function configuration of a mobile terminal according to a second modification of an embodiment.

FIG. 6 is a diagram illustrating a function configuration of a mobile terminal 12 in a second modification of the location determination system. In the second modification, collected ambient sounds are supposed to be irregular sounds, hence mobile terminals 12 may not be able to obtain a voice signal having predetermined or higher intensity level when shifted to the location determination mode. In such a case, it is likely to be a waste of electric power to continuously place all the mobile terminals 12 in the location determination mode so that the mobile terminals 12 may collect irregularly emitted ambient sounds. For this reason, one of the multiple mobile terminals 12 monitors, as a monitoring terminal, voice signals collected by its voice collection unit 28, and other mobile terminals place, as standby terminals, the operation of their voice collection units 28 in a sleep state. When the voice collection unit 28 of the monitoring terminal obtains a voice signal having predetermined or higher intensity level, the monitoring terminal instructs the standby terminals to start collecting voices.

As illustrated in FIG. 6, a voice collection scheduling unit 36 is added to the mobile terminal 12 illustrated in FIG. 2B so that each mobile terminal 12 may act as a monitoring terminal. Other components have the same configuration and functions as those of the mobile terminal 12 illustrated in FIG. 2B and will not be described.

When shifted to the location determination mode, the voice collection scheduling unit 36 monitors voice signals of voices collected by the voice collection unit 28. When the intensity level of a voice signal is predetermined or higher intensity level, the voice collection scheduling unit 36 instructs, via the communication unit 26, other mobile terminals 12 to exit the sleep state and start collecting voices. Thus, each mobile terminal 12 starts executing operations in the location determination mode.

As such a monitoring terminal, a terminal meeting conditions to be met by a monitoring terminal is selected from among all the mobile terminals 12 shifted to the location determination mode. For example, the information control units 34 of all the mobile terminals 12 shifted to the location determination mode exchange information on whether each mobile terminal 12 meets the conditions to be met by a monitoring terminal, and a single mobile terminal 12 meeting the conditions optimally is selected through the information exchange. The conditions to be met by a monitoring terminal preferably include any one of whether the mobile terminal 12 uses an external power supply, the remaining battery charge of the mobile terminal 12, the estimated available operation time of the mobile terminal 12, and whether the mobile terminal 12 uses a microphone.

If a mobile terminal 12 uses an external power supply, the mobile terminal 12 is most suitable as a monitoring terminal, since there is no need to pay attention to the remaining battery charge. A mobile terminal 12 having a larger remaining battery charge is more suitable as a monitoring terminal. The estimated available operation time is determined by the remaining battery charge, and a mobile terminal 12 having a longer estimated available operation time is more suitable as a monitoring terminal. If the microphone included in the voice collection unit 28 of a mobile terminal 12 is placed in a voice collection state for a purpose other than the location determination mode, the mobile terminal 12 is suitable as a monitoring terminal.

Alternatively, the conditions to be met by a monitoring terminal may be prioritized and then a monitoring terminal may be selected according to the prioritized conditions. For example, whether the mobile terminal 12 uses an external power supply is given to the highest priority, and if there is a mobile terminal 12 being driven by an external power supply, this mobile terminal is used as a monitoring terminal. If there is no mobile terminal 12 using an external power supply, a mobile terminal 12 having the largest remaining battery charge or the longest estimated available operation time is selected as a monitoring terminal. The monitoring time during which the monitoring terminal monitors voice signals is set when selecting the monitoring terminal.

Figure 7:
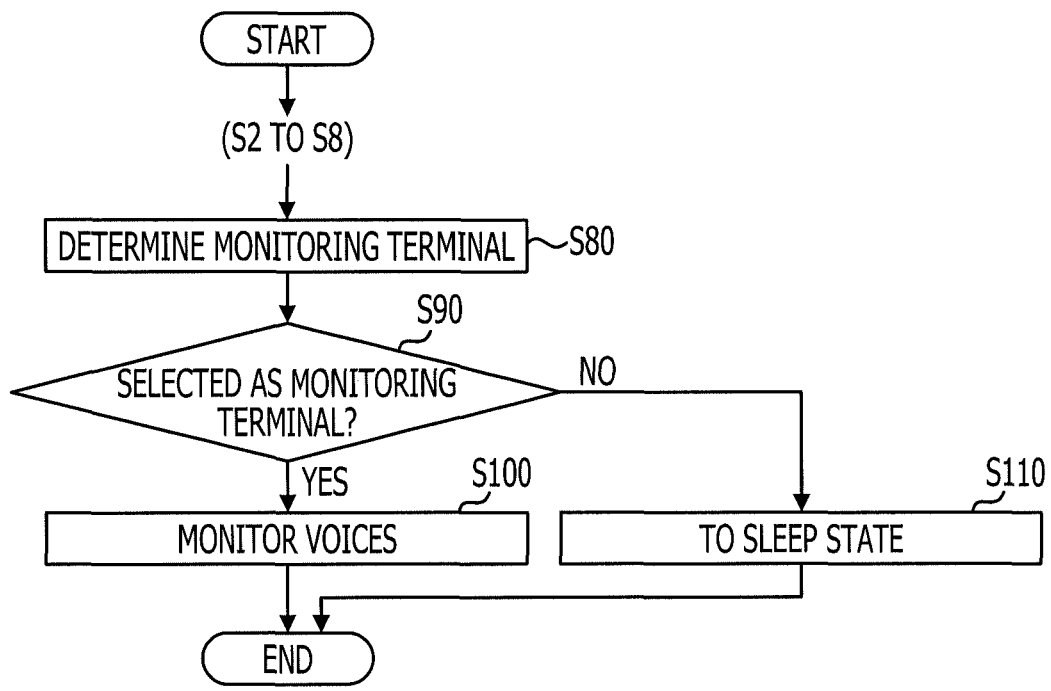
FIG. 7 is a diagram illustrating part of a flow of a second modification of an embodiment.
Figure 8A:
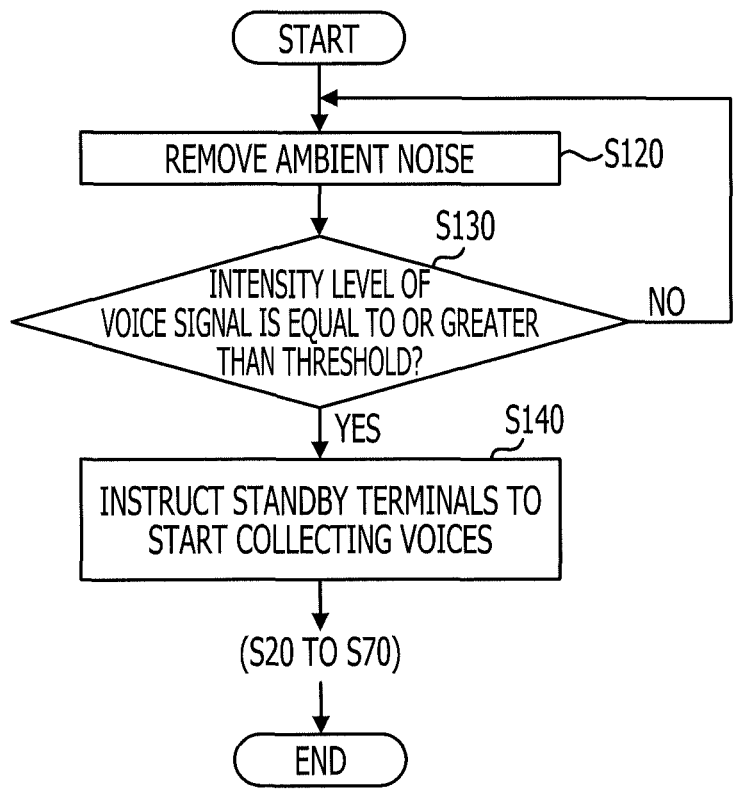
FIGS. 8A and 8B are diagrams illustrating part of a flow of a second modification of an embodiment.
Figure 8B:
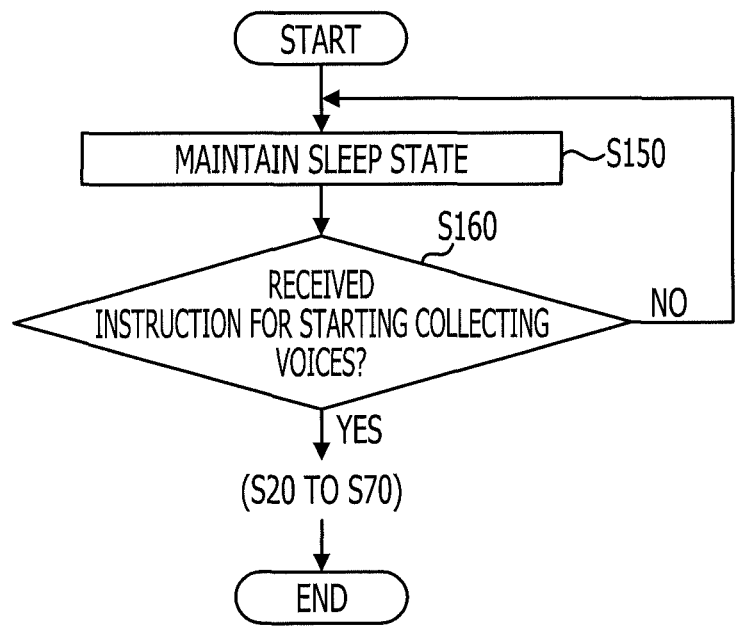

FIGS. 7, 8A, and 8B are diagrams illustrating the flow of the second modification.

First, the same processes as those in S2 to S8 illustrated in FIG. 5 are performed. Subsequently, the mobile terminals 12 shifted to the location determination mode exchange with one another information on the use of an external power supply, the remaining battery charge, the estimated available operation time, or the like of each mobile terminal 12. Then, a terminal optimally meeting the conditions to be met by a monitoring terminal is selected as a monitoring terminal and determined (in S80). Such selection is made by the information control unit 34 of each mobile terminal 12. Since the respective information control units 34 hold the same conditions, the same monitoring terminal is selected by each mobile terminal 12.

Subsequently, each mobile terminal 12 determines whether it has been selected as a monitoring terminal (in S90). If a mobile terminal 12 determines that it has been selected as a mobile terminal (YES in S90), the mobile terminal 12 monitors voices (in S100). In contrast, if a mobile terminal 12 determines that it has not been selected as a mobile terminal (NO in S90), the mobile terminal 12 shifts from the location determination mode to a sleep state (in S110).

As illustrated in FIG. 8A, the voice collection unit 28 of the mobile terminal 12 selected as a mobile terminal first removes ambient noise from the voice signal of a collected voice by filtering (in S120). Ambient noise is constantly occurring background sound and has low-frequency components. Accordingly, a high-pass filter is used in order to remove ambient noise from a voice signal. The voice collection scheduling unit 36 then determines whether the intensity level of the voice signal of the collected voice is equal to or greater than a threshold (in S130). If the intensity level of the voice signal is less than the threshold (NO in S130), the monitoring terminal returns to S120 and continues monitoring voices. In contrast, if the intensity level of the voice signal is equal to or greater than the threshold (YES in S130), the voice collection scheduling unit 36 instructs, via the communication unit 26, the standby terminals placed in a sleep state to start collecting voices (in S140). The monitoring terminal then performs the same processes as S20 to S70 illustrated in FIG. 5.

On the other hand, as illustrated in FIG. 8B, the standby terminals maintain a sleep state before receiving the instruction for starting collecting voices (in S150). The voice collection scheduling unit 36 determines whether its own mobile terminal 12 has received the instruction for starting collecting voices via the communication unit 26 (in S160). If the instruction for starting collecting voices has not been received yet, the standby terminal maintains a sleep state. In contrast, if the instruction for starting collecting voices has been received, the voice collection scheduling unit 36 instructs the information control unit 34 to make an instruction for starting executing operations in the location determination mode. Thus, the voice collection unit 28, the voice analysis unit 30, and the comparison unit 32 start operating, and the standby terminal performs the same processes as S20 to S70 illustrated in FIG. 5.

As seen above, in the second modification, one of the mobile terminals 12 monitors voice signals as a monitoring terminal, and other mobile terminals 12 shift from the location determination mode to a sleep state as standby terminals. When the voice collection unit 28 of the monitoring terminal obtains a voice signal having predetermined or higher intensity level, the monitoring terminal instructs the standby terminals to start collecting voices. Thus, the mobile terminals 12 may determine the location while controlling the waste of power.

Third Modification of Location Determination System

Figure 9:
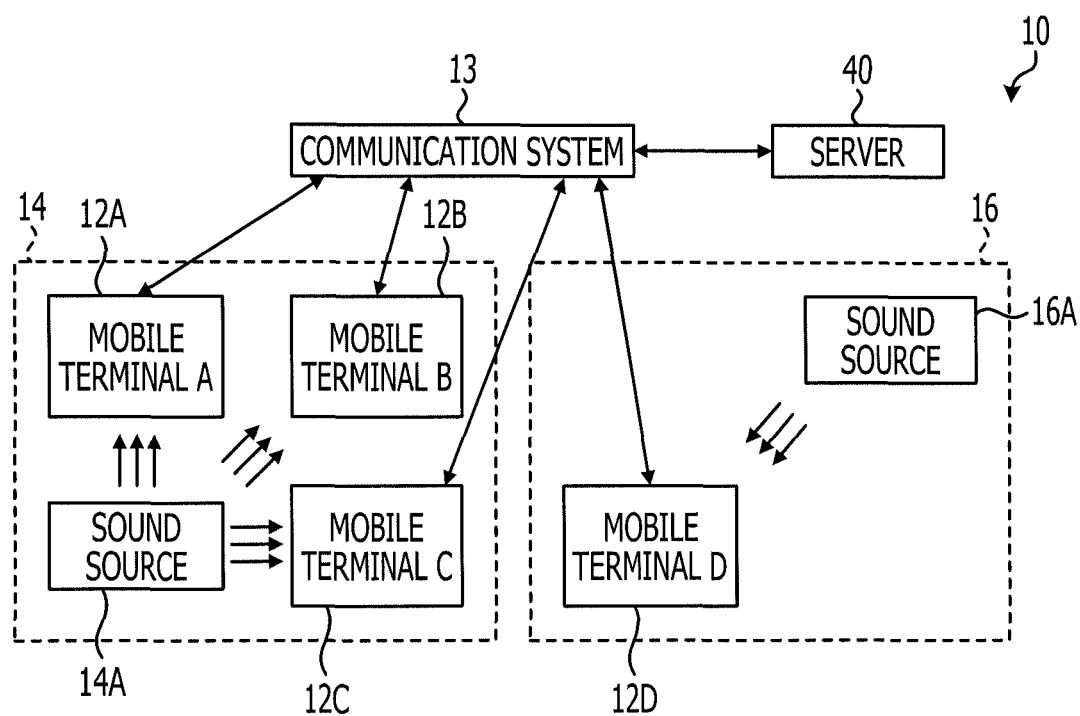
FIG. 9 is a diagram illustrating a location determination system according to a third modification of an embodiment.

FIG. 9 is a diagram illustrating a location determination system 10 according to a third modification.

In the third modification, a server 40 is connected to a communication system 13. In the third modification, each mobile terminal 12 does not compare the analysis results or make a determination. Instead, the server 40 connected to the mobile terminals 12 via the communication system 13 makes a comparison and determination using the analysis results of voices transmitted by the mobile terminals 12.

Figure 10A:
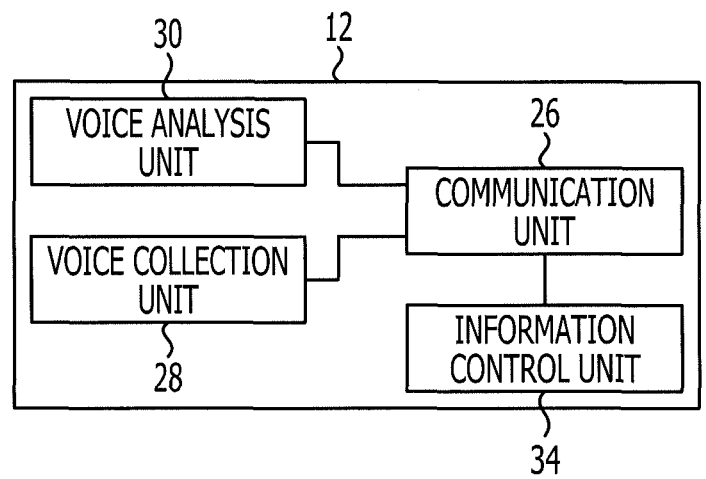
FIG. 10A is a diagram illustrating a function configuration of a mobile terminal according to a third modification in a location determination mode.

FIG. 10A is a diagram illustrating a function configuration of a mobile terminal 12 in the location determination mode. Similar to the mobile terminal 12 illustrated in FIG. 2B, the mobile terminal 12 illustrated in FIG. 10A includes a communication unit 26, a voice collection unit 28, a voice analysis unit 30, and an information control unit 34. The respective functions of the communication unit 26, the voice collection unit 28, the voice analysis unit 30, and the information control unit 34 are the same as those of the counterparts illustrated in FIG. 2B and will not be described. The communication unit 26 transmits the analysis result of a voice to the server 40.

Figure 10B:
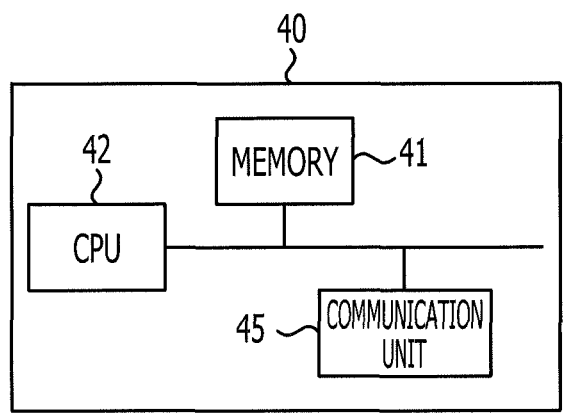
FIG. 10B is a diagram illustrating a hardware configuration of a server according to a third modification.
Figure 10C:
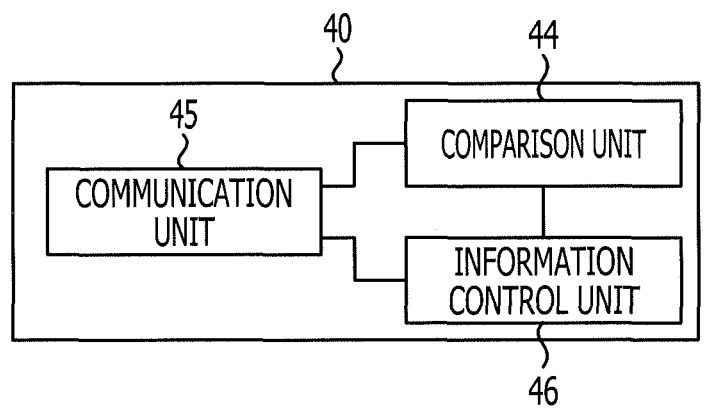
FIG. 10C is a diagram illustrating a function configuration of a server according to a third modification in a location determination mode.

FIG. 10B is a diagram illustrating a hardware configuration of the server 40, and FIG. 10C is a diagram illustrating a function configuration of the server 40. The server 40 includes a CPU 42, a memory 41, and a communication unit 45. The communication unit 45 is connected to the mobile terminals 12 via the communication system 13. Upon receipt of an instruction for shifting to the location determination mode from one of the mobile terminals 12, the server 40 calls a program stored in the memory 41 and forms a comparison unit 44 and an information control unit 46 as software modules. That is, in the location determination mode, the server 40 includes the comparison unit 44, the communication unit 45, and the information control unit 46. The function of the comparison unit 44 is the same as that of the comparison unit 32 in the mobile terminal 12 and will not be described. The information control unit 46 stores the analysis result of a collected voice transmitted by the mobile terminals 12, and collectively stores the determination results made by the comparison unit 44, for each mobile terminal 12. That is, the information control unit 46 stores and retains information as illustrated in FIGS. 4B and 4C, for each mobile terminal 12. Such information may be transmitted to the mobile terminals 12 via the communication system 13.

As seen above, in the third modification, it is possible to collectively manage the results of the location determinations made with respect to each mobile terminal 12 by migrating the function of the comparison unit of each mobile terminal 12 illustrated in FIG. 2B to the server 40.

Fourth Modification of Location Determination System

Figure 11A:
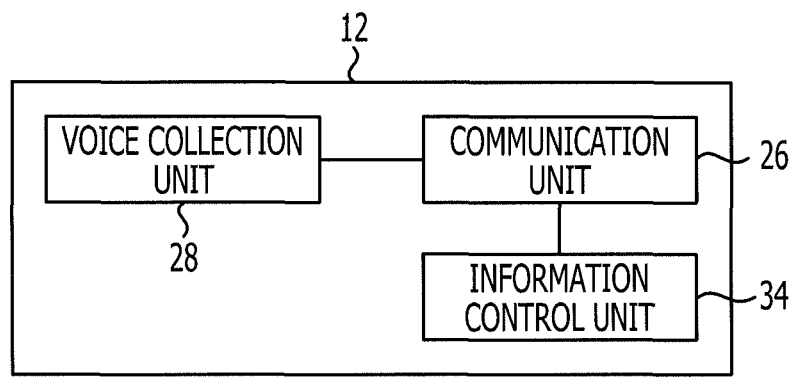
FIG. 11A is a diagram illustrating a function configuration of a mobile terminal according to a fourth modification.
Figure 11B:
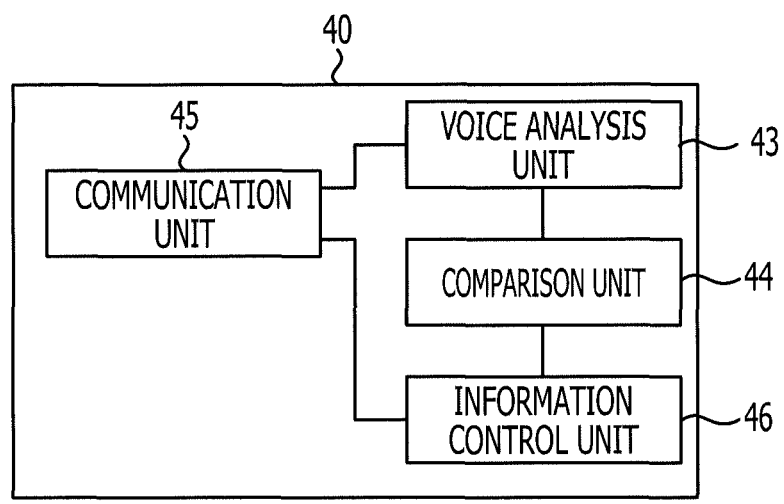
FIG. 11B is a diagram illustrating a function configuration of a server according to a fourth modification.

A fourth modification is a location determination system where the server 40 in the third modification includes a voice analysis unit 43 (illustrated in FIG. 11B) instead of the voice analysis unit 30 included in the mobile terminal 12. Accordingly, the fourth modification is also a location determination system illustrated in FIG. 9. FIG. 11A is a diagram illustrating a function configuration of a mobile terminal 12 used in the location determination system according to the fourth modification. FIG. 11B is a diagram illustrating a function configuration of a server 40 used in the location determination system according to the fourth modification.

In the fourth modification, each mobile terminal 12 does not analyze voice signals, compare the analysis results of voice signals, nor make a determination, and the server 40 connected the mobile terminals 12 via the communication system 13 receives voice signals transmitted by the mobile terminal 12, and analyzes the voice signals, and makes comparisons and determinations.

Similar to the mobile terminal 12 illustrated in FIG. 2B, the mobile terminal 12 illustrated in FIG. 11A includes a communication unit 26, a voice collection unit 28, and an information control unit 34. The respective functions of the communication unit 26, the voice collection unit 28, and the information control unit 34 are the same as those of the counterparts illustrated in FIG. 2B and will not be described. The communication unit 26 transmits the voice signal of a collected voice to the server 40.

Similar to the server 40 illustrated in FIG. 10B, the server 40 includes a CPU 42, a memory 41, and a communication unit 45. The communication unit 45 is connected to the mobile terminals 12 via the communication system 13. Upon receipt of an instruction for shifting to the location determination mode from one of the mobile terminals 12, the server 40 calls a program stored in the memory 41 and forms a voice analysis unit 43, a comparison unit 44 and an information control unit 46 as software modules. That is, in the location determination mode, the server 40 includes the communication unit 45, the voice analysis unit 43, the comparison unit 44, and the information control unit 46. The function of the voice analysis unit 43 is the same as that of the voice analysis unit 30 illustrated in FIG. 2B and will not be described. Further, the function of the comparison unit 44 is the same as that of the comparison unit 32 in the mobile terminal 12 and will not be described. The information control unit 46 stores a voice signal received by the communication unit 45 as well as the analysis result obtained by the voice analysis unit 43, and collectively stores the determination results made by the comparison unit 44, for each mobile terminal 12. That is, the information control unit 46 stores and retains information as illustrated in FIGS. 4B and 4C, for each mobile terminal 12. Such information may be transmitted to the mobile terminals 12 via the communication system 13.

As seen above, in the fourth modification, as in the third modification, it is possible to collectively manage the results of the location determinations made with respect to each mobile terminal 12 by migrating the function of the comparison unit of the mobile terminal 12 illustrated in FIG. 2B to the server 40.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A location determination system comprising:
a first mobile terminal including:
a first processor to
acquire a first sound signal,
analyze the first sound signal to obtain a first analysis result, and
transmit the first analysis result; and
a second mobile terminal including:
a second processor to
acquire a second sound signal,
analyze the second sound signal to obtain a second analysis result,
receive the first analysis result from the first mobile terminal,
compare the second analysis result with the first analysis result to obtain a comparison result, and
determine whether the first mobile terminal is located in an area in which the second mobile terminal is located, based on the comparison result, wherein
the first processor acquires and analyzes the first sound signal periodically at given time intervals to acquire a first feature quantity,
the first processor transmits the first feature quantity as the first analysis result,
the second processor acquires and analyzes the second sound signal periodically at the given time intervals to acquire a second feature quantity as the second analysis result,
the second processor compares the second feature quantity with the first feature quantity received from the first mobile terminal,
the second sound signal corresponding to the compared second feature quantity and the first sound signal corresponding to the compared first feature quantity are acquired at the same time,
the second processor counts a first number of the comparisons within a predetermined time period,
the second processor counts a second number of times when a degree of matching between the second feature quantity and the first feature quantity exceeds a first threshold within the predetermined time period,
the second processor calculates a ratio of the second number to the first number, and
the second processor determines whether the ratio exceeds a second threshold to determine whether the first mobile terminal is located in the area in which the second mobile terminal is located.

2. The location determination system according to claim 1, wherein
the first mobile terminal further includes a first clock,
the first processor acquires first time information indicated by the first clock,
the first processor transmits the first time information,
the second mobile terminal further includes a second clock,
the second processor acquires second time information indicated by the second clock,
the second processor receives the first time information from the first mobile terminal,
the second processor calculates a time difference between the second time information and the first time information, and
the second processor instructs the first mobile terminal to acquire the first sound signal in accordance with the first clock adjusted by the time difference.

3. The location determination system according to claim 1, wherein
the first processor applies a frequency analysis on the first sound signal to obtain first plural peak frequencies,
the first processor transmits the first plural peak frequencies as the first analysis result,
the second processor applies the frequency analysis on the second sound signal to obtain second plural peak frequencies as the second analysis result, and
the second processor compares the second plural peak frequencies with the first plural peak frequencies received from the first mobile terminal, to determine whether the first mobile terminal is located in the area in which the second mobile terminal is located.

4. The location determination system according to claim 1, wherein
the second processor determines that the second mobile terminal is a monitoring terminal, based on predetermined information,
the second processor monitors the second sound signal while the first mobile terminal is in a sleep state in which the first mobile terminal withholds acquiring the first sound signal, and
the second processor instructs, upon receiving the second sound signal having an intensity level exceeding a predetermined intensity level, the first mobile terminal to start acquiring the first sound signal.

5. The location determination system according to claim 4, wherein
the predetermined information includes at least one of
whether the second mobile terminal uses an external power supply,
remaining battery charge of the second mobile terminal,
estimated available operation time of the second mobile terminal, and
whether the second mobile terminal uses a microphone.

6. A location determination system comprising:
a first mobile terminal including:
a first processor to
acquire a first sound signal, and
transmit the first sound signal; and
a second mobile terminal including:
a second processor to
acquire a second sound signal,
receive the first sound signal from the first mobile terminal,
analyze the first sound signal to obtain a first analysis result,
analyze the second sound signal to obtain a second analysis result,
compare the second analysis result with the first analysis result to obtain a comparison result, and
determine whether the first mobile terminal is locator is located in an area in which the second mobile terminal is located, based on the comparison result, wherein
the first processor acquires and transmits the first sound signal periodically at given time intervals,
the second processor analyzes the first sound signal to obtain a first feature quantity as the first analysis result, the second processor acquires and analyzes the second sound signal periodically at the given time intervals to obtain a second feature quantity as the second analysis result, the second processor compares the second feature quantity with the first feature quantity, the second sound signal corresponding to the compared second feature quantity and the first sound signal corresponding to the first feature quantity are acquired at the same time, the second processor counts a first number of the comparisons within a predetermined time period, the second processor counts a second number of times when a degree of matching between the second feature quantity and the first feature quantity exceeds a first threshold within the predetermined time period, the second processor calculates a ratio of the second number to the first number, and the second processor determines whether the ratio exceeds a second threshold to determine whether the first mobile terminal is located in the area in which the second mobile terminal is located.

7. The location determination system according to claim 6, wherein the first mobile terminal further includes a first clock, the first processor acquires first time information indicated by the first clock, the first processor transmits the first time information, the second mobile terminal further includes a second clock, the second processor acquires second time information indicated by the second clock, the second processor receives the first time information from the first mobile terminal, the second processor calculates a time difference between the second time information and the first time information, and the second processor instructs the first mobile terminal to acquire the first sound signal in accordance with the first clock adjusted by the time difference.

8. The location determination system according to claim 6, wherein the second processor applies a frequency analysis on the first sound signal to obtain first plural peak frequencies, the second processor applies the frequency analysis on the second sound signal to obtain second plural peak frequencies as the second analysis result, and the second processor compares the second plural peak frequencies with the first plural peak frequencies, to determine whether the first mobile terminal is located in the area in which the second mobile terminal is located.

9. The location determination system according to claim 6, wherein the second processor determines that the second mobile terminal is a monitoring terminal, based on predetermined information, the second processor monitors the second sound signal while the first mobile terminal is in a sleep state in which the first mobile terminal withholds acquiring the first sound signal, and the second processor instructs, upon receiving the second sound signal having an intensity level exceeding a predetermined intensity level, the first mobile terminal to start acquiring the first sound signal.

10. The location determination system according to claim 9, wherein the predetermined information includes at least one of whether the second mobile terminal uses an external power supply, remaining battery charge of the second mobile terminal, estimated available operation time of the second mobile terminal, and whether the second mobile terminal uses a microphone.

11. A mobile terminal comprising:

a processor to receive a first analysis result from an apparatus, acquire a sound signal, analyze the sound signal to obtain a second analysis result, compare the second analysis result with the first analysis result to obtain a comparison result, and determine whether the apparatus is located in an area in which the mobile terminal is located, based on the comparison result, wherein the processor acquires and analyzes the first analysis result periodically at given time intervals to acquire a first feature quantity, the processor acquires and analyzes the sound signal periodically at the given time intervals to acquire a second feature quantity as the second analysis result, the processor compares the second feature quantity with the first feature quantity, the sound signal corresponding to the compared second feature quantity and the first analysis result corresponding to the compared first feature quantity are acquired at the same time, the processor counts a first number of the comparisons within a predetermined time period, the processor counts a second number of times when a degree of matching between the second feature quantity and the first feature quantity exceeds a first threshold within the predetermined time period, the processor calculates a ratio of the second number to the first number, and the processor determines whether the ratio exceeds a second threshold to determine whether the apparatus is located in the area in which the mobile terminal is located.

12. A mobile terminal comprising:

a processor to receive a first sound signal from an apparatus, analyze the first sound signal to obtain a first analysis result, acquire a second sound signal, analyze the second sound signal to obtain a second analysis result, compare the second analysis result with the first analysis result to obtain a comparison result, and determine whether the apparatus is located in an area in which the mobile terminal is located, based on the comparison result, wherein the processor acquires and analyzes the first sound signal periodically at given time intervals to acquire a first feature quantity, the processor acquires and analyzes the second sound signal periodically at the given time intervals to acquire a second feature quantity as the second analysis result, the processor compares the second feature quantity with the first feature quantity, the second sound signal corresponding to the compared second feature quantity and the first sound signal corresponding to the compared first feature quantity are acquired at the same time, the processor counts a first number of the comparisons within a predetermined time period, the processor counts a second number of times when a degree of matching between the second feature quantity and the first feature quantity exceeds a first threshold within the predetermined time period, the processor calculates a ratio of the second number to the first number, and the processor determines whether the ratio exceeds a second threshold to determine whether the apparatus is located in the area in which the mobile terminal is located.

13. A location determination method executed by a mobile terminal, the location determination method comprising:

receiving a first analysis result from an apparatus;

acquiring a sound signal;

analyzing the sound signal to obtain a second analysis result;

comparing the second analysis result with the first analysis result to obtain a comparison result; and determining, by the mobile terminal, whether the apparatus is located in an area in which the mobile terminal is located, based on the comparison result, wherein acquiring and analyzing the first analysis result periodically at given time intervals to acquire a first feature quantity, acquiring and analyzing the sound signal periodically at the given time intervals to acquire a second feature quantity as the second analysis result, comparing the second feature quantity with the first feature quantity, the sound signal corresponding to the compared second feature quantity and the first analysis result corresponding to the compared first feature quantity are acquired at the same time, counting a first number of the comparisons within a predetermined time period, counting a second number of times when a degree of matching between the second feature quantity and the first feature quantity exceeds a first threshold within the predetermined time period, calculating a ratio of the second number to the first number, and determining whether the ratio exceeds a second threshold to determine whether the apparatus is located in the area in which the mobile terminal is located.

14. A location determination method executed by a mobile terminal, the location determination method comprising:

receiving a first sound signal from an apparatus;

analyzing the first sound signal to obtain a first analysis result;

acquiring a second sound signal;

analyzing the second sound signal to obtain a second analysis result;

comparing the second analysis result with the first analysis result to obtain a comparison result;

determining, by the mobile terminal, whether the apparatus is located in an area in which the mobile terminal is located, based on the comparison result, acquiring and analyzing the first sound signal periodically at given time intervals to acquire a first feature quantity, transmitting the first feature quantity as the first analysis result, acquiring and analyzing the second sound signal periodically at the given time intervals to acquire a second feature quantity as the second analysis result, comparing the second feature quantity with the first feature quantity, the second sound signal corresponding to the compared second feature quantity and the first sound signal corresponding to the compared first feature quantity are acquired at the same time, counting a first number of the comparisons within a predetermined time period, counting a second number of times when a degree of matching between the second feature quantity and the first feature quantity exceeds a first threshold within the predetermined time period, calculating a ratio of the second number to the first number, and determining whether the ratio exceeds a second threshold to determine whether the apparatus is located in the area in which the mobile terminal is located.

* * * * *

UNITED STATES PATENT AND TRADEMARK OFFICE
CERTIFICATE OF CORRECTION

Page 1 of 1

PATENT NO. : 9,026,437 B2
APPLICATION NO. : 13/429561
DATED : May 5, 2015
INVENTOR(S) : Eiji Hasegawa It is certified that error appears in the above-identified patent and that said Letters Patent is hereby corrected as shown below:

In the Claims

Column 16, Line 61, In Claim 6, after "terminal" delete "is locator".

Signed and Sealed this
Eighteenth Day of August, 2015

Michelle K. Lee
*Director of the United States Patent and Trademark Office*